Figure 1:
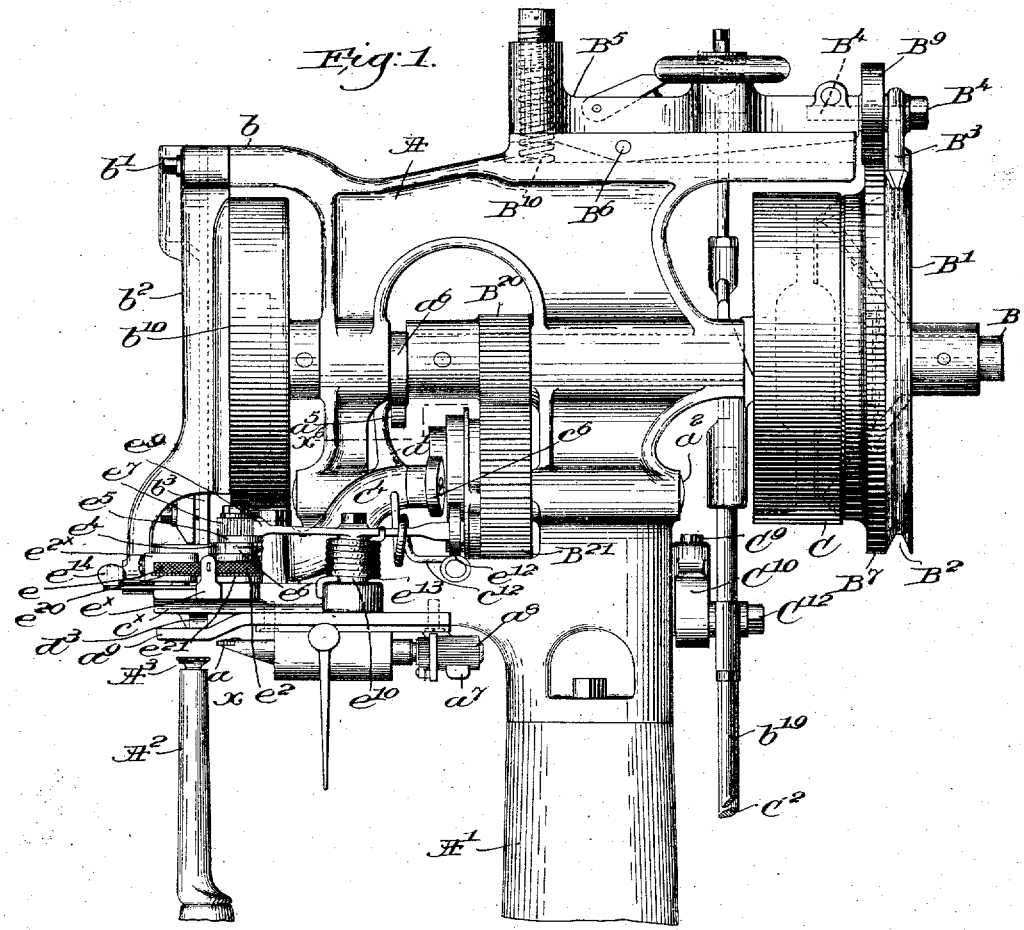

No. 776,832. PATENTED DEC. 6, 1904.
G. GODDU.
MACHINE FOR MAKING AND INSERTING PROTECTORS.
APPLICATION FILED APR. 5, 1900.
NO MODEL. 6 SHEETS—SHEET 1.

Witnesses
Edward F. Allen
Adolf C. Kaiser

Inventor:
George Goddu
by Crosby & Gregory
attys.

No. 776,832. PATENTED DEC. 6, 1904.
G. GODDU.
MACHINE FOR MAKING AND INSERTING PROTECTORS.
APPLICATION FILED APR. 5, 1900.
NO MODEL. 6 SHEETS—SHEET 2.

Witnesses:
Fred L. Grunhof
Edward H. Allen

Inventor:
George Goddu,
By Crosby & Gregory
Attys.

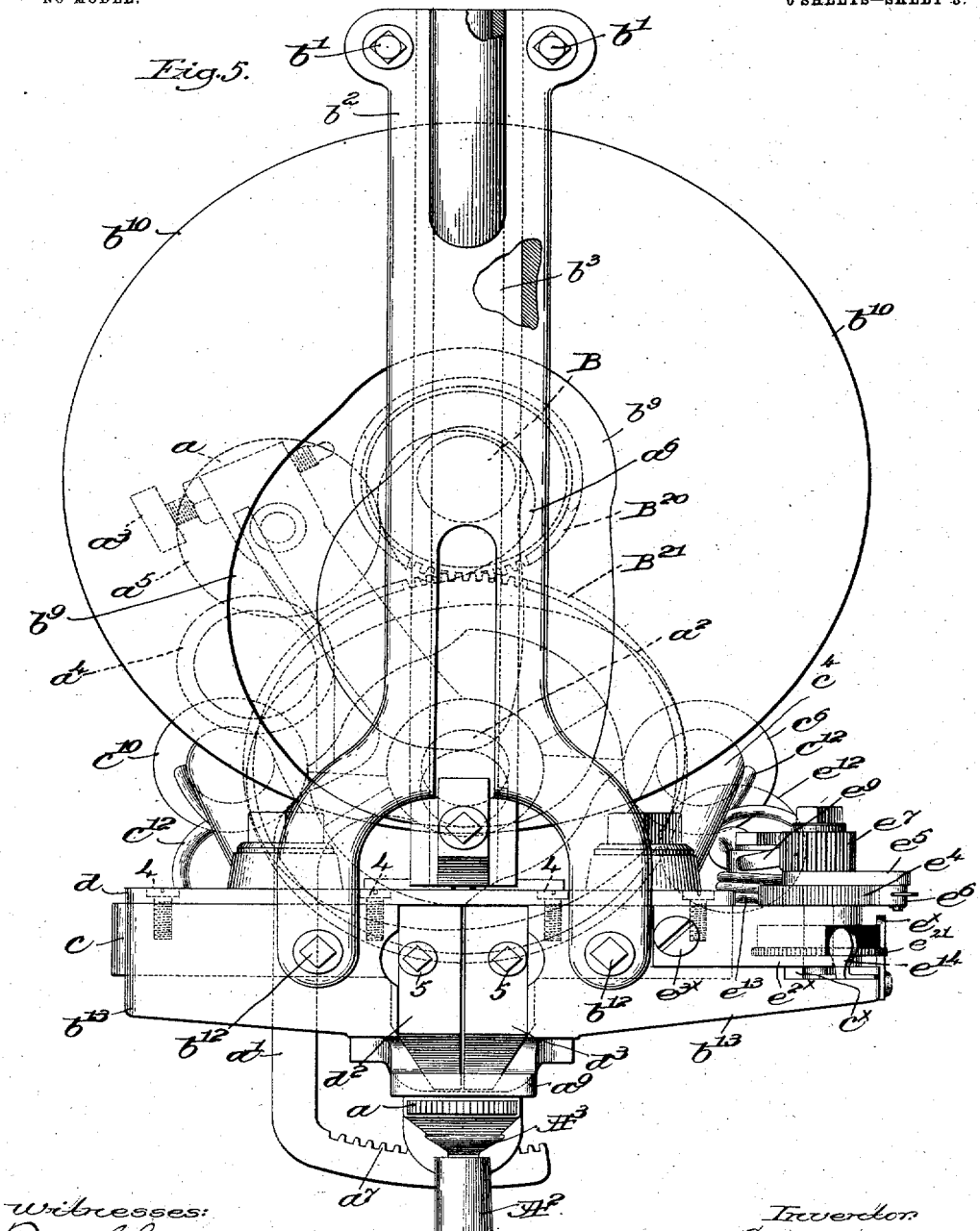

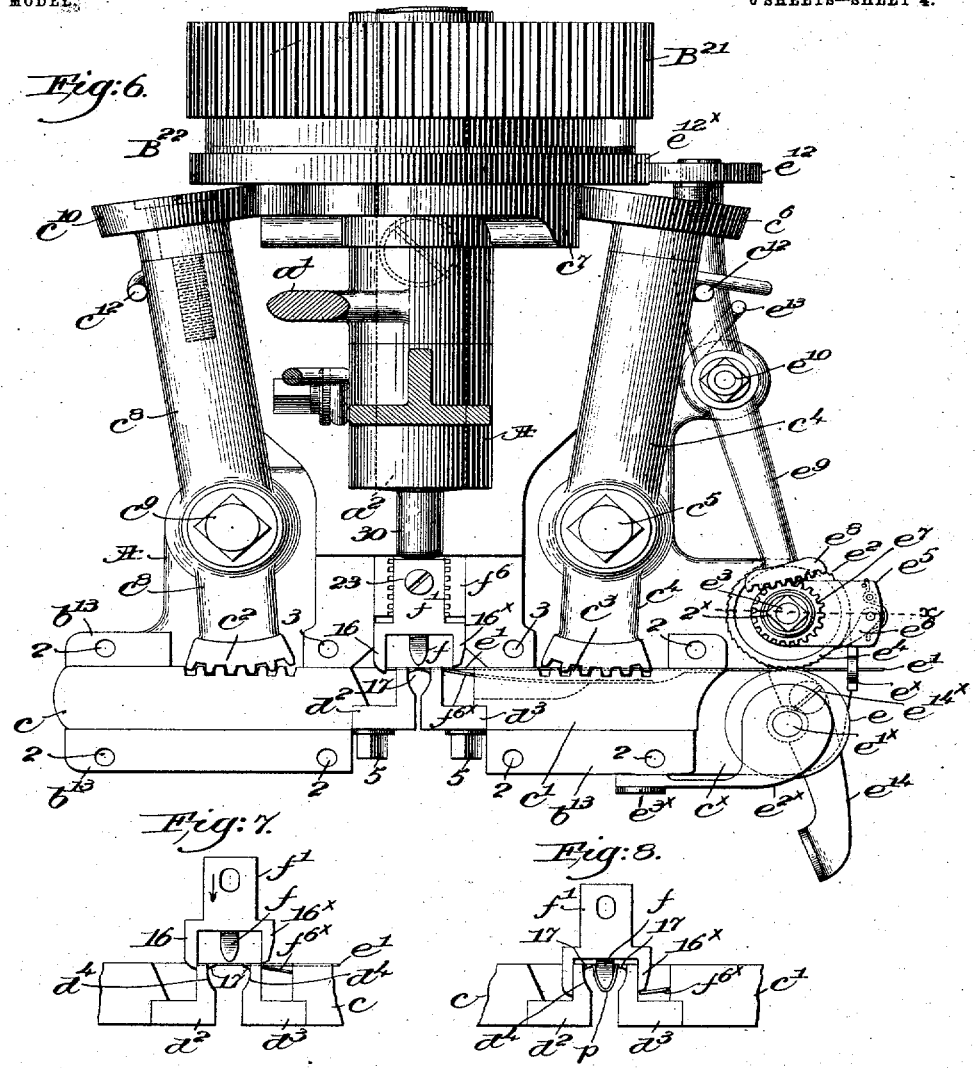

No. 776,832. PATENTED DEC. 6, 1904.
G. GODDU.
MACHINE FOR MAKING AND INSERTING PROTECTORS.
APPLICATION FILED APR. 5, 1900.
NO MODEL. 6 SHEETS—SHEET 5.
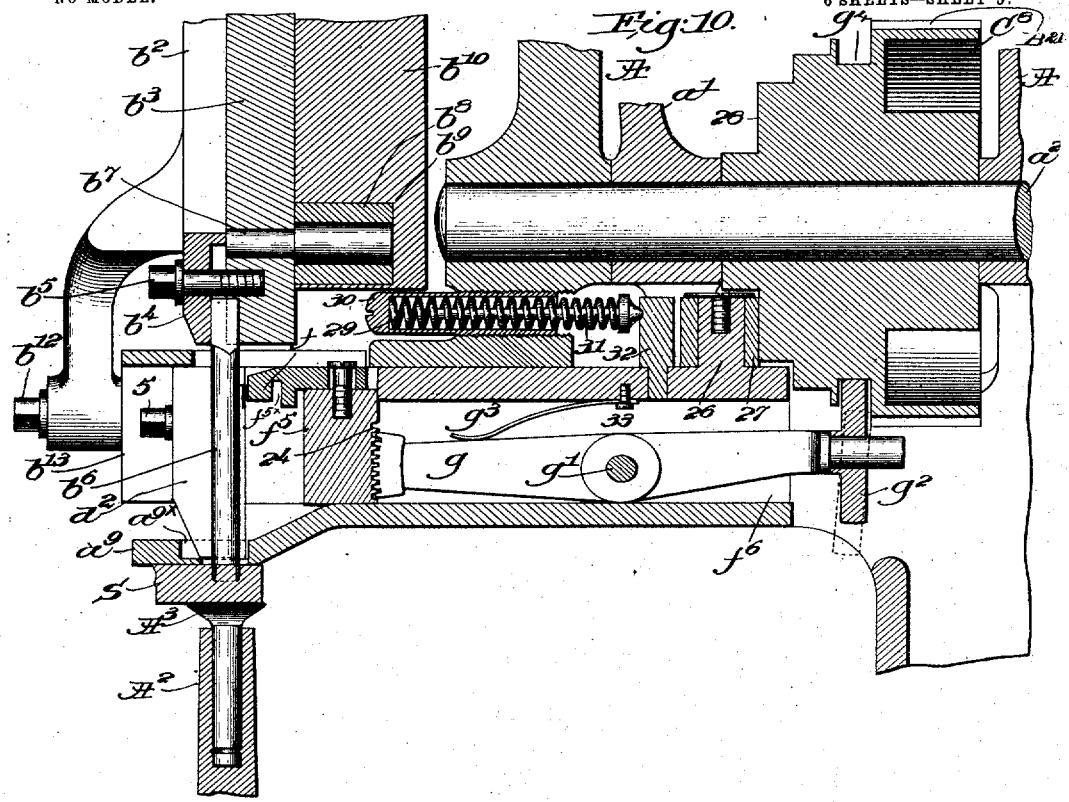
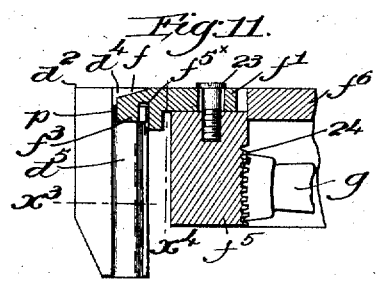
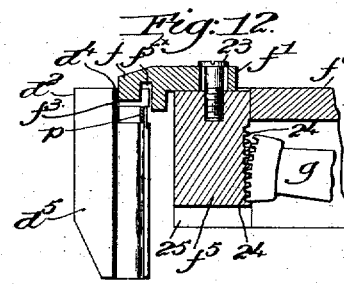
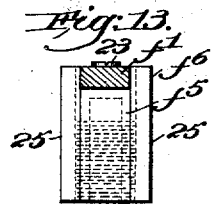
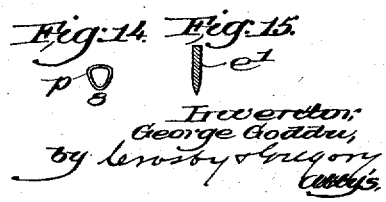

No. 776,832. PATENTED DEC. 6, 1904.
G. GODDU.
MACHINE FOR MAKING AND INSERTING PROTECTORS.
APPLICATION FILED APR. 5, 1900.
NO MODEL. 6 SHEETS—SHEET 6.
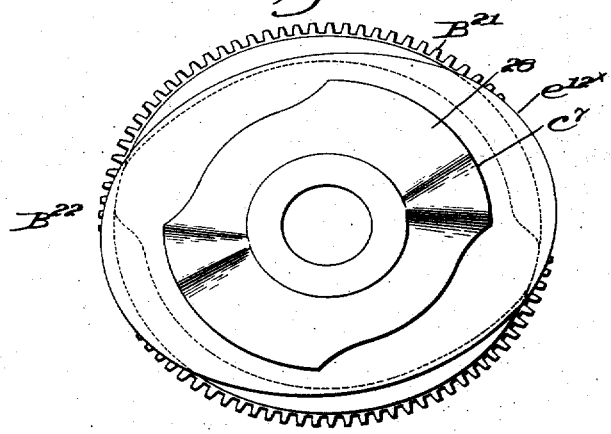
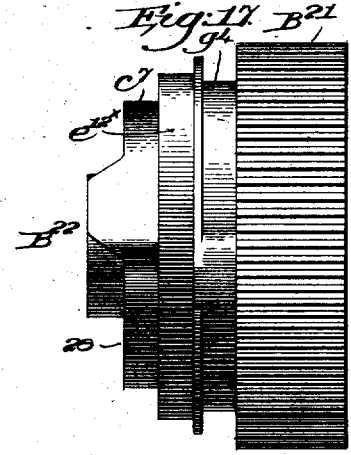
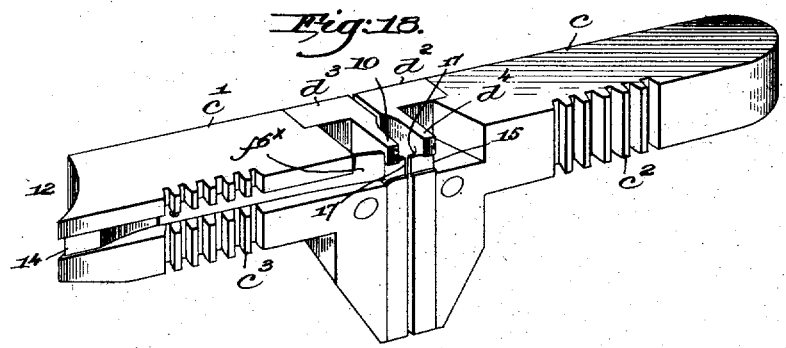
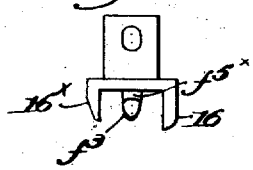
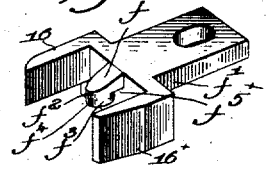

No. 776,832.

Patented December 6, 1904.

UNITED STATES PATENT OFFICE.

GEORGE GODDU, OF WINCHESTER, MASSACHUSETTS, ASSIGNOR TO UNITED SHOE MACHINERY COMPANY, OF BOSTON, MASSACHUSETTS, A CORPORATION OF NEW JERSEY.

MACHINE FOR MAKING AND INSERTING PROTECTORS.

SPECIFICATION forming part of Letters Patent No. 776,832, dated December 6, 1904.

Application filed April 5, 1900. Serial No. 11,691. (No model.)

*To all whom it may concern:*

Be it known that I, GEORGE GODDU, a citizen of the United States, residing at Winchester, county of Middlesex, State of Massachusetts, have invented an Improvement in Machines for Making and Inserting Protectors, of which the following description, in connection with the accompanying drawings, is a specification, like characters on the drawings representing like parts.

This invention relates to machines for inserting protectors; and a very important feature of the invention is a machine adapted both to make protectors and to drive them. Heretofore it has been the practice to manufacture the protectors in one machine and to supply them in quantities to the magazine of another machine, which inserted them in the stock. Much difficulty has been experienced in handling protectors in such protector-inserting machines, because the slight irregularities which often occur in the shape of the protectors cause frequent clogging of the mechanism for segregating and delivering the protectors to the driving mechanism. It is also difficult on account of the shapes of the protectors to deliver them always in proper position to be driven, and although complicated mechanism has been devised for insuring accurate delivery and positioning of the protectors such mechanism is liable to get out of order, and sometimes, by reason, for example, of the irregularities in shape of the protectors, it fails to position the protectors properly and breakage of the machine or injury to the work occurs.

It is desirable to provide protectors with a sharpened or relatively thin entering edge to facilitate the insertion of the protector into the stock. It has, however, been found very difficult in machines in which the protectors are delivered from a magazine to a driving mechanism to provide reliable mechanism for arranging the protectors with their thin entering edges in the same positions. By the present invention, in which the protector is made by the same machine which inserts it into the stock, the protector may easily be controlled as to position at all times, so that it may be presented to the driving mechanism with the desired edge in position to enter the stock.

As I am the first to produce a machine for both making and inserting protectors, I desire to claim this feature of my invention broadly, without reference to the particular form of mechanism in which the invention may be embodied.

In the preferred embodiment of the invention all the operations of making and inserting the protectors are automatic, and the work of inserting protectors into stock—such, for example, as the heels and soles of boots and shoes—may therefore be very rapidly performed; but of course the invention is not limited to machines in which all or any of these operations are automatically performed. It is to be understood also that many of the features of my invention are applicable to machines which make protectors without driving them, while still other features of the invention may be embodied in machines which merely insert protectors that are manufactured in other and independent machines.

One of the objects of the invention is to provide an improved machine for making an approximately U-shaped protector comprising a crown and side portions or wings.

Another object of the invention is to provide a machine for springing or pressing the protector somewhat out of its normal shape—that is, out of the shape which by reason of its resilience it tends to assume when free—and for inserting the protector edgewise into the stock while it is held so pressed or sprung out of normal shape. A protector inserted into the stock in this condition tends to spring back into its original shape after having been driven, and it is thereby held more securely in the stock than if it had been inserted while in its normal shape or condition.

In the machine herein shown as embodying my invention the protectors are made from protector material, which is fed to the machine in the form of a strip or ribbon of the desired cross-sectional shape, having, preferably, one edge thinned or sharpened to form a suitable entering edge for the protector, and from which strip or ribbon blanks of proper length are severed. The blanks might of course be formed at a separate operation and presented to the machine one by one, if desired. The blanks are bent or otherwise shaped to produce protectors of the desired form and are then inserted into the stock by a suitable driving mechanism. The machine is shown as provided with an outside former, into which the blank is forced to shape it partially, and with an inside former around which the partially-shaped blank is pressed and bent by the outside former to complete the shaping of the protector. Preferably one of the formers is then withdrawn, leaving the protector held by the other former, which serves as a guide for the protector while it is being inserted into the stock by the driver. As herein shown, the inside former is withdrawn and the outside former holds the protector in the shape or condition in which it has been formed and resists the tendency of the wings or side portions to spring outwardly on account of the resilience of the metal. The driver is then actuated to force the protector through the outside former and into the stock. As a result of holding the protector so that it cannot spring back toward original shape until after it has been inserted in the stock the resilience of the metal is exerted against the stock into which the protector has been driven and aids materially in retaining the protector in the stock.

I believe that I am the first to devise a machine for driving a protector in its condition of forming, so that the resilience of the metal is not allowed to become effective until after the protector has been driven. I also believe that I am the first to spring or press a protector or similar article formed of resilient material out of its normal shape and drive it edgewise into the stock while it is held in such condition, whereby it tends to spring back to original shape after having been driven and is thereby securely retained in the stock. I desire, therefore, to claim, broadly, these features of my invention.

The protector may have given to it by the machine any desired form by changing the shapes of the inside and outside formers. I have herein shown a protector approximately U-shaped, with the free ends of the wings bent inwardly; but the ends might be bent outwardly or left straight or the protector be given any shape other than U shape, if desired.

By the term "protector" as herein used I intend to designate any slug or other device of whatever shape or configuration adapted to be driven edgewise into the stock.

The outside former of the machine may, and preferably will be, made in two parts, each part being shaped to conform substantially to the shape it is desired that the crown and sides or wings of the protector shall present, the term "crown" being used to designate that part of the protector connecting the wings. Each part of the outside former preferably will have coöperating with it a downward extension forming part of a passage through which the protector is to be driven, said extension substantially meeting the stock in order that the protector may not be released from pressure or allowed to expand during the process of driving it into the stock.

In the machine herein illustrated as embodying my invention the inside former is given a forward movement to act upon and bend the protector-blank into the outside former, and it is given thereafter a vertical movement to remove it from the formed protector and then backward and downward movements to put it into its starting position.

Figure 2:
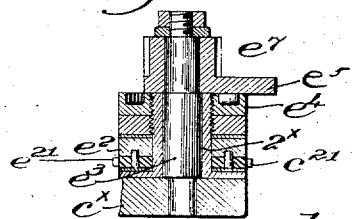
Figure 3:
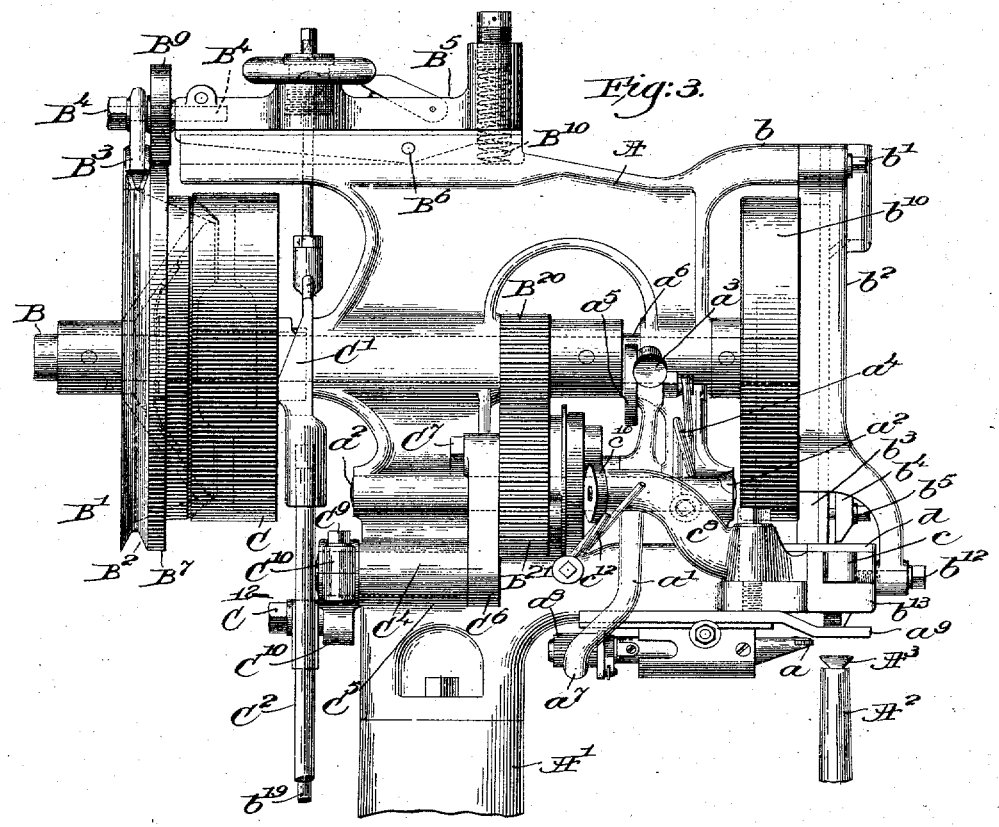
Figure 4:
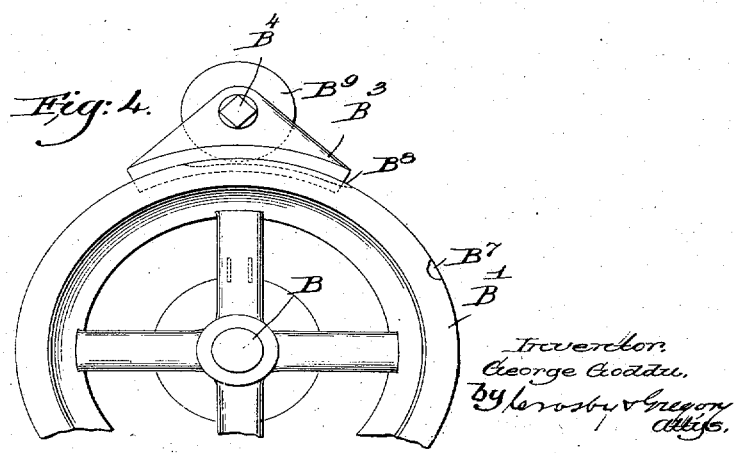

In the accompanying drawings, showing my invention in one of the best forms now known to me, Figure 1 represents in right-hand side elevation the upper portion of a machine containing my improvements, together with part of a horn or stock-support of usual construction. Fig. 2 is a partial section in the line $x$, Fig. 6, through the feeding-wheel for the strip. Fig. 3 represents a left-hand side view of the upper part of said machine. Fig. 4 is a detail showing the brake device coöperating with the fast pulley. Fig. 5 is an enlarged front elevation of the head of the machine and the upper end of the horn; Fig. 6, a plan view of parts below the dotted line $x^6$, Fig. 1; Figs. 7, 8, and 9, details showing the inside and outside formers in three different positions; Fig. 10, an enlarged partial vertical section chiefly to show the inner former and its actuating devices, the horn-post also being in section. Figs. 11 and 12 show details of the inside and outside formers, the inner former occupying different positions in the outside former. Fig. 12$^a$ is a detail showing a protector wrapped or formed about the inside former; Fig. 12$^b$, a section in the dotted line $x^3$, Fig. 11. Fig. 13 is a sectional detail to the right of the line $x^4$, Fig. 11. Fig. 14 shows a protector such as will be made by the use of formers such as herein represented. Fig. 15 shows an enlarged cross-section of the strip employed in the production of protectors. Fig. 16 is a left-hand end view of the operating cam hub or block removed from Fig. 1; Fig. 17, a side elevation thereof; Fig. 18, a detail showing the outside former and its carriers. Fig. 19 shows the inside former; Fig. 20, an under side view of the part shown in Fig. 19, but on a smaller scale.

The head A of the machine rests on a suitable column A', adapted to stand on the floor. The head contains a shaft B, provided at its rear end with a fly-wheel B', forming part of a driving-clutch and also having at its periphery a groove $B^2$, with which coöperates a suitable brake device $B^3$, mounted on a stud $B^4$, secured to a lever $B^5$, pivoted at $B^6$ and having coöperating with it a spring $B^{10}$, which normally acts to cause the roller $B^9$, mounted on the stud $B^4$, to remain in contact with the cam $B^7$, forming part of the fly-wheel $B'$. The shaft B also has loose upon it a pulley C, forming the second member of a pulley-clutch by which to rotate the shaft B, said pulley being driven by a belt from any usual or suitable counter-shaft.

The lever $B^5$ has connected with it the upper end of a starting-rod $C^2$, having a suitable cam-block $C'$, (see Fig. 3,) which when the rod $C^2$ is elevated, as it may be by a treadle located at the floor and with which the rod $C^2$ is connected, will cause the constantly-running pulley C to engage the fly-wheel $B'$ and start the machine. The surface $B^7$ of the fly-wheel has a depression $B^8$, (shown by dotted lines in Fig. 4,) said depression receiving the roller $B^9$ of the brake-lever, and the machine may be stopped only when the roller $B^9$ enters the said depression. The elevation of the starting-rod $C^2$ raises the roller $B^9$ out of said depression and the brake device $B^3$ out of contact with the fly-wheel.

The parts so far described and designated by letter are and may be substantially as indicated in my former patent, No. 583,044.

To automatically depress the horn periodically for feeding, I have provided a rock-shaft $C^4$, (shown by dotted lines in Fig. 3 as extended through a bearing $C^5$,) the right-hand end of said rock-shaft (viewing Fig. 3) having an arm $C^6$, carrying a roller or other stud $C^7$, which enters a cam-groove $C^8$ (see Fig. 10) in the rear side of the gear $B^{21}$. The left-hand end (see Fig. 3) of the shaft $C^4$ has clamped upon it by a set-screw $C^9$ an arm $C^{10}$, having a stud $C^{12}$, which is connected with the upper end of a rod $b^{19}$, it in practice carrying a pawl or device, as represented in United States Patent No. 265,227, dated September 26, 1882, said rod in its upward movement causing the depression of the horn that the stock may be fed on the same, as required.

Instead of the particular horn herein represented and the particular means referred to and herein partially disclosed for reciprocating the horn according to the requirements of the work in feeding and clamping the stock I may employ any usual or well-known means commonly employed for this purpose in machines for inserting metallic and other fastenings.

The horn-operating mechanism herein shown constitutes no portion of my invention.

The main shaft B has fast upon it a pinion $B^{20}$, which engages a toothed gear $B^{21}$ on a stud or shaft $a^2$, said gear $B^{21}$ being preferably in a single piece with a cam-hub $B^{22}$, having various cam-surfaces to be herein described.

The shoe sustained on the stock-support may be fed thereon when the stock-support is lowered in usual manner by a feed-wheel $a$, rotated intermittingly by a lever $a'$, having its fulcrum on the stud or shaft $a^2$ in the framework. (See Fig. 3.) The lever $a'$ near its upper end has a feed-regulating device shown as a screw $a^3$, and said lever is normally moved by a spring $a^4$ to cause the end of said screw to contact with the framework, the said lever having a stud on which is mounted a roller $a^5$, acted upon by a cam $a^6$, moving with the shaft B. The cam acts upon the roller $a^5$ for a longer or shorter period in each rotation of said shaft to impart more or less throw to said lever, according to the position occupied by the adjusting device or screw $a^3$, which when adjusted to cause the cam $a^6$ to move the lever $a'$ for a less distance shortens the feed. The lower end of the lever $a'$ has a toothed sector $a^7$, which engages a toothed sleeve $a^8$, loose on a shaft having a carrier on which is mounted a pawl, which imparts movement step by step to the feed-wheel $a$, all substantially as shown and described in United States Patent No. 403,835, dated May 21, 1889.

The foot-plate $a^9$ in the form of my invention herein illustrated is cut away at $a^{9\times}$, as shown in Fig. 10, to form an opening large enough to receive the lower ends of the extensions of the parts $d^2$ and $d^3$ of the outside former, which extensions, as hereinafter explained, form a driver-passage.

The projection $b$ of the head (see Fig. 3) receives bolts $b'$, which are extended through holes made in the upper end of a guideway $b^2$ to confine it to the head. The guideway receives a driver-bar $b^3$, having secured to its lower end by a clamp $b^4$ and screw $b^5$ (see Fig. 10) a driver $b^6$. The driver-bar $b^3$ at its rear side (see Fig. 10) has a stud $b^7$, represented as provided with a roller $b^8$, which enters a suitable cam-groove $b^9$, (shown best in Fig. 5,) cut in a disk $b^{10}$, fast on the end of the shaft B, said cam operating the driver-bar and driver positively in both of its strokes. The driver may, however, be actuated in any other usual or suitable way.

The lower end of the driver-guideway $b^2$ is forked (see Fig. 5) and has bolt-holes to receive bolts $b^{12}$, which enter bolt-holes in the oppositely-extended ears $b^{13}$, (see Fig. 6,) represented as forming fixed parts of the head A. The ears $b^{13}$ are grooved to receive two carriers $c\ c'$. (Shown in position in Fig. 6 and detached in Fig. 18.) These carriers are toothed, respectively, at $c^2$ and $c^3$, the teeth $c^3$ being engaged by the teeth of, as herein shown, a sector-lever $c^4$, pivoted at $c^5$ and having at its opposite end a roller $c^6$, which is acted upon to move said lever and its connected carrier at the proper times by a cam $c^7$, formed upon the periphery of the cam-hub $B^{22}$. The teeth $c^3$, as herein shown, are engaged by the teeth of a sector-lever $c^8$, pivoted at $c^9$ and having at its opposite end a roller $c^{10}$, herein represented as being operated by the same cam $c^2$, suitable like springs $c^{12}$ bearing against said levers and acting normally to keep the rollers $c^6$ and $c^{10}$ against said cam. The levers are actuated to reciprocate the carriers in opposite directions in unison. The ears $b^{13}$ have, as shown, suitable tapped holes 2 and the main part of the head suitable holes 3, which receive screws 4, used to secure in place a cover-plate $d$, which overlaps and retains the carriers $c$ $c'$ in working position. Each carrier at its inner end has connected with it, as herein shown, by bolts 5 one of the parts $d^2$ $d^3$, which together constitute the outside former. These parts, as best shown in Fig. 18, are grooved at 15 in line with the strip-guideway 14, cut in the rear side of the carrier $c'$ and inside the grooves referred to, which position the strip preparatory to bending the same to form a protector, each part $d^2$ and $d^3$ may and preferably will have an inturned lip 17, and back of said lip the inner side of each part is shaped to present a wall $d^4$, conforming substantially with the exterior of the inner former, to be described, and, as herein represented, (see Figs. 11, 12, and $12^b$,) the parts referred to as constituting the outside former are prolonged by a downward extension $d^5$, having a surface conforming in shape substantially to the outside former, so that the said outside former and the said extensions $d^5$ may present alined surfaces permitting the formed protector to be driven into the stock in its condition of forming.

Preferably each part of the outside former and its extension $d^5$ are made in one and the same piece, yet this invention would not be departed from were they made in separate pieces.

The lips 17, which are instrumental in inturning the ends of the wings of the protector, are preferably formed integral with the parts $d^2$ $d^3$ of the outside former, so that they are moved with the parts of that former; but the invention is not limited to a construction in which the means for inturning the ends of the wings are thus constructed and actuated.

The corner 10 of the part $d^3$ of the outside former constitutes one member of a cutting mechanism for the strip $e'$ from which the protectors are formed, the other member being a finger $16^\times$, herein represented as connected with the block $f'$, carrying the inside former $f$.

The inside former has, as herein represented, at its under side a depending portion $f^3$, (see Figs. 19 and 20,) and the former is recessed, as at $f^{5\times}$. The shape of the inside former $f^3$ determines the shape of the crown and wings of the protector, and the blank from which the protector is made may be bent about the former or wrapped about the same when the ends of the blank forming the protector are to be inturned or when the protector is to present a throat narrower than the greatest width of the protector. The block $f'$, carrying the inside former, is provided with a finger 16, which forms a stop to arrest the leading end of the strip $e'$, from which are cut the blanks to be made into protectors.

The driver $b^6$ in driving a formed protector enters the space between the two parts $d^2$ and $d^3$ of the outside former, meets the protector in its formed position, and forces the same through the space between the extensions $d^5$, which thus constitute a driver-passage. The parts $d^2$ and $d^3$ of the outside former preferably remain closed together until the protector is driven, so that these parts and the extensions $d^5$ form a holder and guideway combined, which retains the protector until driven in the shape to which it has been bent and sprung by the formers, preventing the wings of the protector from springing outward, as they tend to do because of the resilience of the cold metal from which the protectors are formed.

The right-hand ear $b^{13}$ of the frame has an extension $c^\times$, which supports a guide $e^\times$ for the strip of protector material $e'$, which after passing through said guide also passes through feeding mechanism and through the guideway 14 at the rear side of the carrier $c'$. The feeding mechanism for the strip may be of any usual or suitable construction. The feeding device shown consists of a pressure-roller $e$, (see Fig. 6,) mounted on a stud $e'^\times$, erected in a bracket $e^{2\times}$, secured to one of the ears $b^{13}$ by a suitable screw $e^{3\times}$, and a suitable roller $e^2$, mounted on a sleeve $2^\times$, surrounding loosely a stud $e^3$, erected in the extension $c^\times$. The sleeve $2^\times$ also has connected with it a ratchet-wheel $e^4$, which is engaged by a spring-pressed pawl $e^6$, mounted upon a pawl-carrier $e^5$. The pawl-carrier has an attached pinion $e^7$, which is engaged by the toothed end $e^8$ of a lever $e^9$, having its fulcrum on a stud $e^{10}$, the opposite end of said lever having a roller $e^{12}$, which is maintained in contact with a cam $e^{12\times}$ of the cam-hub $B^{22}$ by a spring $e^{13}$. Below the roller $e^2$ and suitably secured to it by pins (see Fig. 2) is a toothed disk $e^{31}$, the teeth of which engage corresponding teeth of a similar toothed disk secured to the roller $e$, so that the roller $e^2$ moves the roller $e$ in unison with it. A lever $e^{14}$, pivoted at $e^{14\times}$ on the extension $c^\times$, has a cam-shaped inner end, (see Fig. 6,) which rests normally in contact with the lower end of the stud $e'^\times$, upon which the pressure-roller $e$ is mounted, and by turning the outer end of this lever to the left viewing Fig. 6 the cam-shaped end acting on the stud $e'^\times$ causes the movement of the roller $e$ away from the roller $e^2$ to enable the strip to be introduced or to be removed readily, the bracket $e^{2\times}$ being of spring metal to enable it to spring under the action of said lever. The strip of protector-forming material may be taken from any usual reel. (Not shown.) The feeding mechanism at each operation feeds the strip far enough to cause its free end to meet the finger or stop 16, before referred to, said finger during such operation occupying the position shown in Fig. 6.

The block $f'$, carrying the inside former, is slotted to receive a screw 23, by which it is adjustably connected to the vertically-movable slide-block $f^5$. The slide-block $f^5$ is mounted in the forked front end of a horizontally-movable slide $f^6$ and is held against horizontal movement in said slide by means of interlocking grooves and ribs formed on the adjacent faces of the block and forks 25 of the slide, as shown most clearly in plan view in Fig. 6. (See also Fig. 13.) The slide $f^6$ is sustained upon the upper face of the foot-plate $a^9$ and is provided with a stud 26, carrying a roller 27, which is normally held in contact with the cam-face 28 of the cam-block $B^{22}$ by a spiral spring 29, located in an adjustable tube 30, the spring acting at one end against the head of a rod 31, thereby pressing said rod against a stud 32 on the slide, as shown most clearly in Fig. 10.

In practice the inside former is withdrawn from the protector after the protector has been shaped, and for this purpose I have provided former-actuating means, shown in this present embodiment of my invention as a lever $g$ mounted in a recess in the lower face of the slide $f^6$ and fulcrumed to said slide at $g'$, one end of said lever having teeth engaging teeth 24 on the rear side of the slide-block $f^5$, while the opposite end of the lever has slidably mounted upon it a roller $g^2$, which is normally kept pressed by a spring $g^3$, attached to the slide $f^6$ by a screw 33, against the cam-face $g^4$ of the cam-block $B^{22}$. The cam-block has all its cam-faces made to act in like manner twice during each rotation of the cam-block, it rotating but once while the shaft B rotates twice, two protectors being made and driven at each rotation of said cam-block.

In the operation of the machine let it be supposed that the end of the strip $e'$ has been put in position by the feeding mechanism to bear against the stop 16, as represented in Fig. 6. In this condition of the parts the carriers $c$ $c'$ preferably occupy a position to place the parts $d^2$ and $d^3$ of the outside former and their lips 17 substantially close together, this being desirable to prevent the free end of the strip approaching the stop 16 from catching upon the outside former, a spring as $f^{6\times}$, held by a screw in the bottom of the strip-guideway 14, acting to prevent the leading end of the strip from meeting the part $d^3$ of the outside former. The strip having been placed against the stop 16 the parts $d^2$ and $d^3$ of the outside former in the further movement of the machine are separated by a movement of the levers $c^3$ and $c^4$ into the position Fig. 7, at which time the slide $f^6$ is moved forwardly by the cam-face 28 of the cam-hub $B^{22}$, said slide in its forward movement pushing the block $f'$, its attached inner former, and the cutter member $16^\times$ thereof forwardly or in the direction of the arrow thereon, (see Fig. 7,) causing the cutter member $16^\times$, coöperating with the corner 10 of the part $d^3$ of the outside former, to cut the strip $e'$, leaving a blank from which to form a protector, said blank being prevented from dropping by reason of its standing in the grooves 15 of the outside former. As soon as the strip has been severed to form a blank the inside former meets the blank supported at its ends and moving in the direction of the arrow in Fig. 7 acts upon the unsupported side of the blank midway its ends and bends and carries the blank into the space between the parts of the outside former, as represented in Fig. 8, the finger 16 and the cutter $16^\times$ sliding at such time over the parallel sides of the two parts of the outside former and serving to prevent said parts from spreading. As the inside former completes its stroke (see Fig. 8) it will be noticed that the protector-blank has been forced by the inside former between the inturned lips 17, with which the outside former is shown as provided, and that said lips contact with the outer side of the protector, as represented in Fig. 8. With the parts in the condition Fig. 8 the carriers $c$ $c'$ are actuated to cause the parts $d^2$ and $d^3$ of the outside former to approach each other, they moving from the position Fig. 8 into the position Fig. 9, the lips 17 of the outside former yet contacting with the protector, wrapping the same about the inside former if, as herein shown, the protector is to have its end or ends inturned or is to be shaped to present a contracted throat, the ends of the blank entering the recess $f^{5\times}$ of the inside former. In this position (see Fig. 9) the outside wall of the protector is acted upon by the inner walls $d^4$ of the outside former, said walls holding the formed protector under compression in its position of forming and preventing the sides of the protector from springing outward on account of the resilience of the metal.

A protector $p$ such as is formed in the machine herein described by closing the outside former on the inside former is represented in Fig. 14.

With the machine in the condition represented in Fig. 9 the inside former must be withdrawn from the formed protector, and to effect this operation the cam $g^4$ acts upon the roller $g^2$ and elevates the slide-block $f^5$, carrying upwardly with it the inside former from the position Figs. 11 and $12^a$ into the position Fig. 12, leaving the protector $p$ clamped by the outside former in the condition of forming, and then the slide $f^6$ is retracted by means of the spring 29, hereinbefore described. Should it be desired to discharge the formed protectors from the forming apparatus described without driving them, the outside former might be separated, permitting the protector to drop; but should this happen the protector, owing to the spring of the metal, would expand. Keeping the protector under compression in the condition in which it is formed and driving it in such condition in order that the inherent tendency of the protector to expand may be utilized to advantage in the stock and the desired contour of the protector be maintained is one important feature of this invention. Accordingly provision has been made to retain the outside former in the position it occupied when the blank was bent about the inside former to form the protector, and so after the inside former is withdrawn the outside former remains in position while the driver $b^6$ descending meets the upper end of and drives the formed protector through the driver-passage, preferably formed, as hereinbefore described, by the extensions or faces $d^5$ of the outside former. After the driver has acted upon a protector yet in its condition of forming and has driven the same and the strip has been fed to place its end against the stop 16, as represented in Fig. 6, the carriers are again moved to open the space of the outside former and the operation above described is repeated.

It will be obvious that by a change of shape of the inside former $f^3$ in its cross-section and a corresponding change in shape of the outside former and its lips a protector of any desired shape may be readily made, the protector presenting inturned ends or a contracted throat at any portion thereof, or if it is not desired to bend in the ends of the wings of the protector the lips of the outside former may be omitted.

Having described my invention, what I claim, and desire to secure by Letters Patent, is—

1. In a machine of the class described, means to bend metal to form protectors having laterally-projecting wings, and means to drive said protectors with their wings extended laterally.

2. In a machine of the class described, means to bend metal to form protectors having inturned end portions, and means to drive said protectors.

3. In a machine of the class described, means to feed a strip of metal, means to form from said strip protectors having laterally-projecting wings, and means to drive said protectors.

4. In a machine of the class described, the combination with means for bending metal to form protectors of means for driving said protectors edgewise into the stock.

5. In a machine of the class described, means for bending a protector-blank in the direction of its thickness to form a winged protector and for laterally bending the ends of the wings of the protector, combined with means for driving the protector while the wings are held in their bent position.

6. In a machine of the class described, means for springing the wings of a protector out of their normal positions, and means for driving it into the stock while its wings are held sprung out of normal position.

7. In a machine of the class described, the combination with a driver of means for laterally bending a protector-blank to form a winged protector having inturned ends and for holding the ends so bent while the protector is driven.

8. In a machine of the class described, the combination with a driver of means for pressing or springing a resilient protector out of its normal shape and holding it in that condition while it is driven edgewise into the stock.

9. A machine for forming and inserting protectors comprising an outside former, an inside former, means to actuate them to bend a blank into the form of a protector having inwardly-bent end portions, a driver, and means to actuate it to drive said protector.

10. An outside former, comprising relatively movable parts and open vertically at one side; a movable inside former, means to move the inside former into the outside former, means to close the outside former, and means to withdraw the inside former from the closed outside former.

11. An outside former comprising a plurality of members, movable toward and from one another, an inside former, means to move the inside former to bend a blank into the opening between the separated members of the outside former, means to close the outside former thereafter for bending the blank about the inside former to form a protector, and means to withdraw the inside former from the protector held in the outside former.

12. In an apparatus for forming protectors, an outside former composed of a plurality of members, an inside former having a portion shaped to accord with the interior of the protector to be produced, means to move the inside former toward and into the outside former for bending a blank into the space between the separated members constituting the outside former, in combination with means which is operative while said inside former occupies a position inside said outside former to close the outside former and bend the blank about the inside former to complete the shaping of the protector, and means thereafter to withdraw the inside former from the formed protector.

13. In a machine of the class described, an outside former open at its two ends and one side, an inside former, means to insert the inside former into the outside former through the opening in its side to form a protector, means to withdraw said inside former through the opening in one end of the outside former, leaving the protector in the outside former, and means to expel the protector through the other end of the outside former.

14. An outside former, an inside former, means to move the formers relatively to cause them to bend a blank into the form of a protector having inwardly-extending end portions, means to withdraw the inside former from the protector, a driver, and means to actuate it to drive the protector.

15. An outside former, an inside former, means to move said formers relatively to cause them to bend a blank into the form of a protector having inwardly-extending end portions, and means to withdraw one of the formers leaving the protectors sustained by the other former, a driver, and means to actuate it to force the protector from the former into the work.

16. In a machine for forming and driving protectors, an outside former comprising relatively movable jaws, said jaws being provided with extensions forming a throat for the protector, which is adapted to prevent expansion thereof, an inside former movable to bend a blank into the outside former, and means to close the jaws of the outside former further to shape the protector, a driver, and means to actuate it to drive the protector out of the outside former and through the throat.

17. A machine of the class described, comprising an inside former, an outside former adapted to sustain a portion of a strip of metal to be formed into a protector, means to cut said metal strip into protector-blanks, and means to move said formers whereby the inside former bends the blank sustained by the outside former into the space thereof and then the outside former is closed about the inside former to inturn the ends of the protector, combined with a driver and means to actuate the driver for forcing the protector from the outside former into the stock.

18. In a protector making and driving machine, a driver, means for actuating the driver, an outside former composed of jaws having grooved extensions to form a guideway, an inside former, and means to actuate said formers to bend the material transversely of its width and form a protector, the latter being held in its condition of forming while being discharged through said guideway by the driver.

19. In a machine for forming and driving protectors, an outside former having inturned lips to sustain a protector-blank near its ends while said blank is being shaped, an inside former, means to move the latter to bend the protector-blank into the outside former, means to move said outside former to close the blank about the inside former, means to withdraw the inside former from the protector leaving said protector held by the outside former, and a driver to force the protector from the outside former.

20. In a machine of the class described, means to form a protector and retain it in the condition of forming, and means to effect the driving of the protector edge first into stock while the protector is held in the condition in which it was formed.

21. In a machine of the class described, an outside former composed of a plurality of parts, means to open and close said parts in the production of a protector, said parts having grooved extensions forming a throat to lead the protector to the stock, and a driver for forcing the protector from the former through said throat into the stock.

22. An outside former composed of a plurality of members, one of which is provided with one member of a strip-cutter, said members being adapted to sustain the strip to be cut and formed into a protector, an inside former provided with the second member of a strip-cutter, and means to move said inside former to cut the strip and bend the severed portion into the outside former.

23. An outside former having its faces grooved to guide a strip, said former having connected with it one member of a strip-cutter, an inside former, a stop and a cutter extended forwardly from the opposite sides of said inside former, the stop being the longer, means to feed a strip in the groove of the outside former against said stop, and means to actuate said formers to cut the strip and shape the severed portion into a protector.

24. An outside former composed of a plurality of movable members, an inside former, means to move the inside former to bend a strip into the space in the outside former, said inside former having projections adapted to engage the outside former during the bending of the strip between the members of the outside former to prevent undue separation of the members of the outside former.

25. In a machine for forming protectors, an outside former, carriers to support the same, means to slide said carriers toward and from each other, an inside former, a slide-block with which said inside former is connected, a carrier for said block, means to actuate said carrier, and means to move said block in said carrier to remove the inside former from within a protector held by the outside former.

26. In a machine of the class described, an outside former, comprising two movable members having inwardly-extended lips, combined with an inside former, means to move said inside former to act on a protector-blank and force it between the members of the outside former leaving the ends of the blanks sustained by said lips, and means independent of the inside former to actuate said outside former and close its members about the inside former, the lips of the outside former bending the ends of the blank toward each other, combined with a driver and means for actuating the driver to force the protector from the outside former into the stock.

27. An outside former open at one side and supporting one side of a protector-blank, and having a downward extension to meet the stock, combined with a horizontally-movable inside former adapted to meet and bend said blank into the open side of the outside former, and a driver to drive a protector from the outside former through said extension into the stock.

28. A machine of the class described comprising a vertically-movable driver and having provision for supporting a protector-blank at one side of the path of the driver, combined with protector-forming devices, means to actuate said devices to bend the blank transversely and place it in the path of the driver, and means to actuate the driver to force the protector into the stock.

29. In a machine of the class described, a guideway adapted to receive a protector and comprising relatively movable members, means for moving the guideway members to spring the wings of the protector out of normal position, and means for driving the protector from the guideway into the stock while its wings are held out of normal position.

30. In a machine of the class described, the combination with means for holding and guiding a protector, and for springing the wings of the protector out of their normal position, of a driver for forcing the protector into the stock while its wings are held sprung out of normal position.

31. In a machine of the class described, the combination with a driver, of means for laterally bending and holding the wings of a protector while it is being driven.

32. In a machine of the class described, the combination with a driver, of means for supporting a protector-blank, bending said blank to form a winged protector, and holding the wings in their bent position while the protector is being driven.

33. A machine of the class described, comprising means for automatically forming protectors, and automatic driving mechanism for inserting the protectors edgewise into stock.

34. A machine of the class described, comprising automatic mechanism for forming winged protectors and automatic mechanism for driving said protectors in a direction at an angle to the direction in which the wings extend.

In testimony whereof I have signed my name to this specification in the presence of two subscribing witnesses.

GEORGE GODDU.

Witnesses:
 GEO. W. GREGORY,
 MARGARET A. DUNN.

---

Corrections in Letters Patent No. 776,832.

It is hereby certified that in Letters Patent No. 776,832, granted December 6, 1904, upon the application of George Goddu, of Winchester, Massachusetts, for an improvement in "Machines for Making and Inserting Protectors," errors appear in the printed specification requiring correction, as follows: In line 6, page 4, the reference letter and numeral "c⁷" should read c⁷, and in line 124, same page, the word "left" should read *right;* and that the said Letters Patent should be read with these corrections therein that the same may conform to the record of the case in the Patent Office.

Signed and sealed this 10th day of January, A. D., 1905.

[SEAL.]

F. I. ALLEN,
*Commissioner of Patents.* a driver and means for actuating the driver to force the protector from the outside former into the stock.

27. An outside former open at one side and supporting one side of a protector-blank, and having a downward extension to meet the stock, combined with a horizontally-movable inside former adapted to meet and bend said blank into the open side of the outside former, and a driver to drive a protector from the outside former through said extension into the stock.

28. A machine of the class described comprising a vertically-movable driver and having provision for supporting a protector-blank at one side of the path of the driver, combined with protector-forming devices, means to actuate said devices to bend the blank transversely and place it in the path of the driver, and means to actuate the driver to force the protector into the stock.

29. In a machine of the class described, a guideway adapted to receive a protector and comprising relatively movable members, means for moving the guideway members to spring the wings of the protector out of normal position, and means for driving the protector from the guideway into the stock while its wings are held out of normal position.

30. In a machine of the class described, the combination with means for holding and guiding a protector, and for springing the wings of the protector out of their normal position, of a driver for forcing the protector into the stock while its wings are held sprung out of normal position.

31. In a machine of the class described, the combination with a driver, of means for laterally bending and holding the wings of a protector while it is being driven.

32. In a machine of the class described, the combination with a driver, of means for supporting a protector-blank, bending said blank to form a winged protector, and holding the wings in their bent position while the protector is being driven.

33. A machine of the class described, comprising means for automatically forming protectors, and automatic driving mechanism for inserting the protectors edgewise into stock.

34. A machine of the class described, comprising automatic mechanism for forming winged protectors and automatic mechanism for driving said protectors in a direction at an angle to the direction in which the wings extend.

In testimony whereof I have signed my name to this specification in the presence of two subscribing witnesses.

GEORGE GODDU.

Witnesses:
 GEO. W. GREGORY,
 MARGARET A. DUNN.

---

Corrections in Letters Patent No. 776,832.

It is hereby certified that in Letters Patent No. 776,832, granted December 6, 1904, upon the application of George Goddu, of Winchester, Massachusetts, for an improvement in "Machines for Making and Inserting Protectors," errors appear in the printed specification requiring correction, as follows: In line 6, page 4, the reference letter and numeral "c⁷" should read c⁷, and in line 124, same page, the word "left" should read *right;* and that the said Letters Patent should be read with these corrections therein that the same may conform to the record of the case in the Patent Office.

Signed and sealed this 10th day of January, A. D., 1905.

[SEAL.]

F. I. ALLEN,
*Commissioner of Patents.*

Corrections in Letters Patent No. 776,832.

It is hereby certified that in Letters Patent No. 776,832, granted December 6, 1904, upon the application of George Goddu, of Winchester, Massachusetts, for an improvement in "Machines for Making and Inserting Protectors," errors appear in the printed specification requiring correction, as follows: In line 6, page 4, the reference letter and numeral "$c^2$" should read $c^1$, and in line 124, same page, the word "left" should read *right;* and that the said Letters Patent should be read with these corrections therein that the same may conform to the record of the case in the Patent Office.

Signed and sealed this 10th day of January, A. D., 1905.

[SEAL.]

F. I. ALLEN,
*Commissioner of Patents.*